United States Patent [19]
Fuchisawa

[11] Patent Number: 6,023,627
[45] Date of Patent: Feb. 8, 2000

[54] DIGITAL CORDLESS TELEPHONE SYSTEM HAVING COMMUNICATION MODE SWITCHING DEVICE

[75] Inventor: Takashi Fuchisawa, Tokyo, Japan

[73] Assignee: NEC Corporation, Japan

[21] Appl. No.: 08/979,008

[22] Filed: Nov. 26, 1997

Related U.S. Application Data

[63] Continuation of application No. 08/557,861, Nov. 14, 1995, abandoned.

[30] Foreign Application Priority Data

Nov. 14, 1994 [JP] Japan .................................. 6-302713

[51] Int. Cl.[7] .............................. H04Q 7/32; H04Q 7/18
[52] U.S. Cl. ......................... 455/550; 455/462; 455/465; 455/552; 455/573; 455/421
[58] Field of Search .................................... 455/550, 403, 455/462, 465, 552, 421, 426, 443, 575, 90, 345, 573

[56] References Cited

U.S. PATENT DOCUMENTS 5,428,668   6/1995   Dent et al. ................................ 379/59

FOREIGN PATENT DOCUMENTS 2282735   4/1995   United Kingdom .
2284727   6/1995   United Kingdom .
91 02424  2/1991   WIPO .

Primary Examiner—Wellington Chin
Assistant Examiner—Keith Ferguson
Attorney, Agent, or Firm—Ostrolenk, Faber, Gerb & Soffen, LLP

[57] ABSTRACT

A digital cordless telephone system includes a plurality of radio base stations, a master unit, a subsidiary unit, a charging base, and a communication mode switching unit. The radio base stations are connected to a public line and each cover a certain service area. The master unit is connected to a personal line. The subsidiary unit is connected to a nearby radio base station or the master unit through a time-division multiplex radio channel to transmit/receive speech and control data. The charging base charges the subsidiary unit. The communication mode switching unit includes a detection section for detecting that the subsidiary unit is placed on the charging base, and a control section for automatically selecting whether to connect the subsidiary unit to a radio base station or the master unit depending on whether the subsidiary unit is placed on the charging base.

6 Claims, 4 Drawing Sheets

FIG. 4A
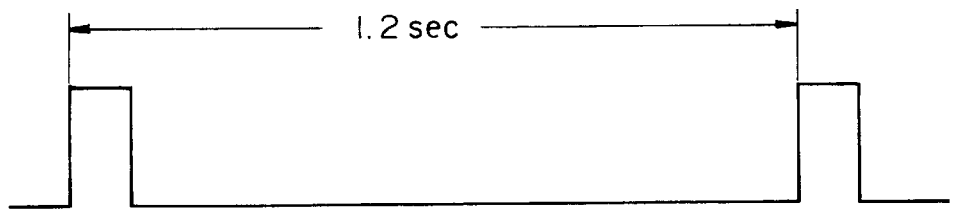
FIG. 4B
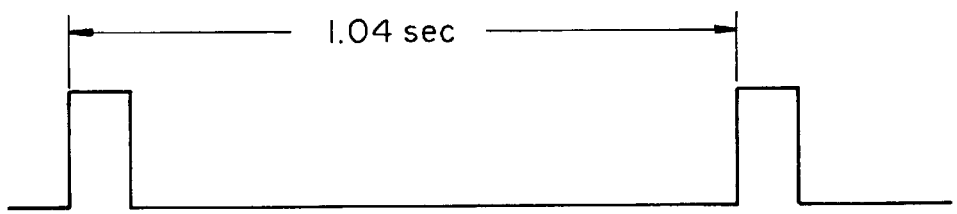
FIG. 5A
| SERVICE COMPANY IDENTIFICATION CODE | GENERAL CALL AREA NUMBER | ADDITIONAL ID |
|---|---|---|
| 1 ┊ 0000 0001 | 0000 0000 0000 0001 | 0000 0000 0000 0000 1 |
FIG. 5B
| SYSTEM CALL CODE | ADDITIONAL ID |
|---|---|
| 0 ┊ 0000 0001  0000 0000 0000 0001 | 0000 0000 0000 0000 1 |

DIGITAL CORDLESS TELEPHONE SYSTEM HAVING COMMUNICATION MODE SWITCHING DEVICE

This is a Continuation of application Ser. No. 08/557,861, filed on Nov. 14, 1995, now abandoned.

BACKGROUND OF THE INVENTION

1. Field of the Invention

The present invention relates to a digital cordless telephone system and, more particularly, to a digital cordless telephone system having a communication mode switching device, which can connect a telephone unit either to a master unit connected to a personal or private line or to a radio base station connected to a public line through a time-division multiplex channel.

2. Description of the Prior Art

A conventional digital cordless telephone system is constituted by a plurality of radio base stations connected to a public line, a master unit connected to a personal line, and a subsidiary unit which is connected either to one of the radio base stations or to the master unit through a time-division radio channel so as to transmit/receive speech and control data. In the range in which the subsidiary unit can be connected to both the radio base station and the master unit, the user must manually switch the mode of using the public line for connection and the mode of using the personal line by a key operation or the like.

In the digital cordless telephone system, the subsidiary unit can be connected either to the radio base station connected to the public line or to the master unit connected to the personal line through a time-division multiplex radio channel. The charge for the public line is higher than that for the personal line.

As described above, in order to select the public line or the personal line for connection, the user must perform a key operation or the like.

In the range in which the subsidiary unit can be connected to both the radio base station and the master unit, the subsidiary unit may be connected to the public line, for which the charge is high, if the user does not switch the connection lines, even though the subsidiary unit can be connected to the personal line. This will increase the charge for lines and the like.

SUMMARY OF THE INVENTION

The present invention has been made in consideration of the above situation, and has as its object to provide a digital cordless telephone having a communication mode switching device which automatically switches connection lines with a simple arrangement.

In order to achieve the above object, according to a fundamental aspect of the present invention, there is provided a digital cordless telephone system comprising a plurality of radio base stations connected to a public line and each adapted to cover a service area, a master unit connected to a personal line, a subsidiary unit which is connected to one of the radio base stations or the master unit through a time-division multiplex radio channel to transmit/receive speech and control data, a charging base for charging the subsidiary unit, and a communication mode switching unit including means for detecting that the subsidiary unit is placed on the charging base, and a control section for automatically selecting whether to connect the subsidiary unit to one of the radio base stations or the master unit depending on whether the subsidiary unit is placed on the charging base.

In the present invention, the means for detecting whether the subsidiary unit is placed on the charging base and the control section are preferably arranged in the subsidiary unit.

In the present invention, when a connection range of the master unit overlaps a connection range of the radio base station, the control section preferably performs switching control such that the personal line is selected as a line to be connected to the subsidiary unit when the detection means detects that the subsidiary unit is placed on the charging base, and the public line is set as a line to be connected to the subsidiary unit when the detection means detects that the subsidiary unit is not placed on the charging base.

According to the present invention, by detecting whether the subsidiary unit in the digital cordless telephone system is placed on the charging base, a line to be connected to the subsidiary unit is automatically selected, thereby providing convenience for the user.

In addition, according to the present invention, the frequency of connection of the subsidiary unit to a radio base station connected to the public line in a range in which the subsidiary unit can be connected to the master unit connected to the personal line can be reduced or eliminated, thereby reducing the charge for lines.

The above and many other advantages, features and additional objects of the present invention will become manifest to those versed in the art upon making reference to the following detailed description and accompanying drawings in which preferred structural embodiments incorporating the principles of the present invention are shown by way of illustrative example.

BRIEF DESCRIPTION OF THE DRAWINGS

FIGS. 4A and 4B are timing charts respectively showing the reception timings in standby states in a public line connection mode and a personal line connection mode according to the embodiment of the present invention; and FIGS. 5A and 5B respectively show the signal formats of identification codes in standby states in the public line connection mode and the personal line connection mode.

DETAILED DESCRIPTION OF THE PREFERRED EMBODIMENT

An embodiment of the present invention will be described in detail below with reference to the accompanying drawings.

A digital cordless telephone system according to an embodiment of the present invention is constituted by a plurality of radio base stations connected to a public line and each adapted to cover a service area, a master unit connected to a personal line, a subsidiary unit which is connected either to one of the base stations or to the master unit through a time-division multiplex radio channel so as to transmit/receive speech and control data, and a charging base for charging the subsidiary unit.

Figure 1:
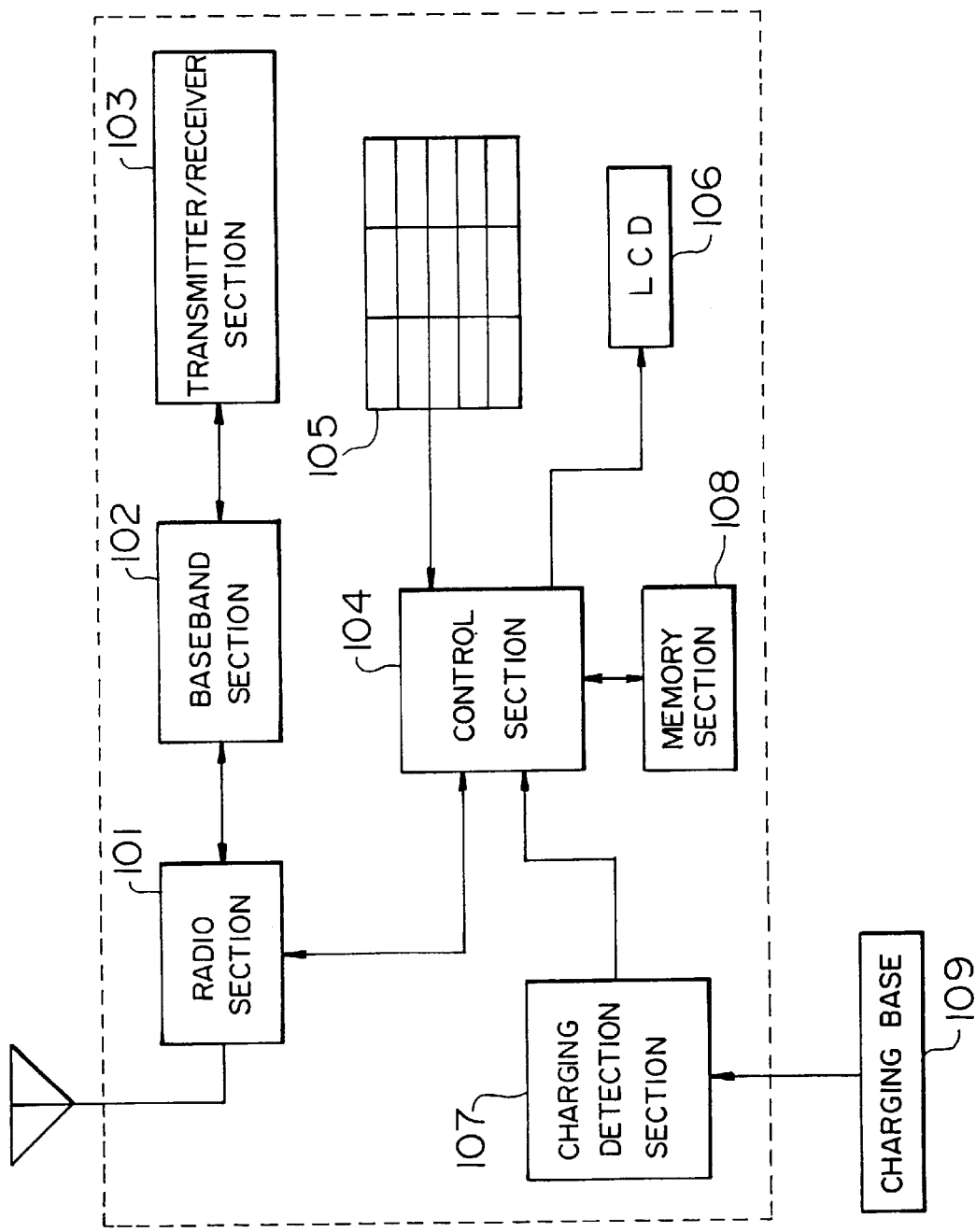
FIG. 1 is a block diagram showing the arrangement of a subsidiary unit in an embodiment of the present invention.

FIG. 1 is a block diagram showing the arrangement of the subsidiary unit in the digital cordless telephone system according to this embodiment.

Referring to FIG. 1, a subsidiary unit in the digital cordless telephone system has a radio section 101, a baseband section 102, a transmitter/receiver section 103, a control section 104, operation keys 105, an LCD display section 106, a charging detection section 107, and a memory section 108.

Figure 2:
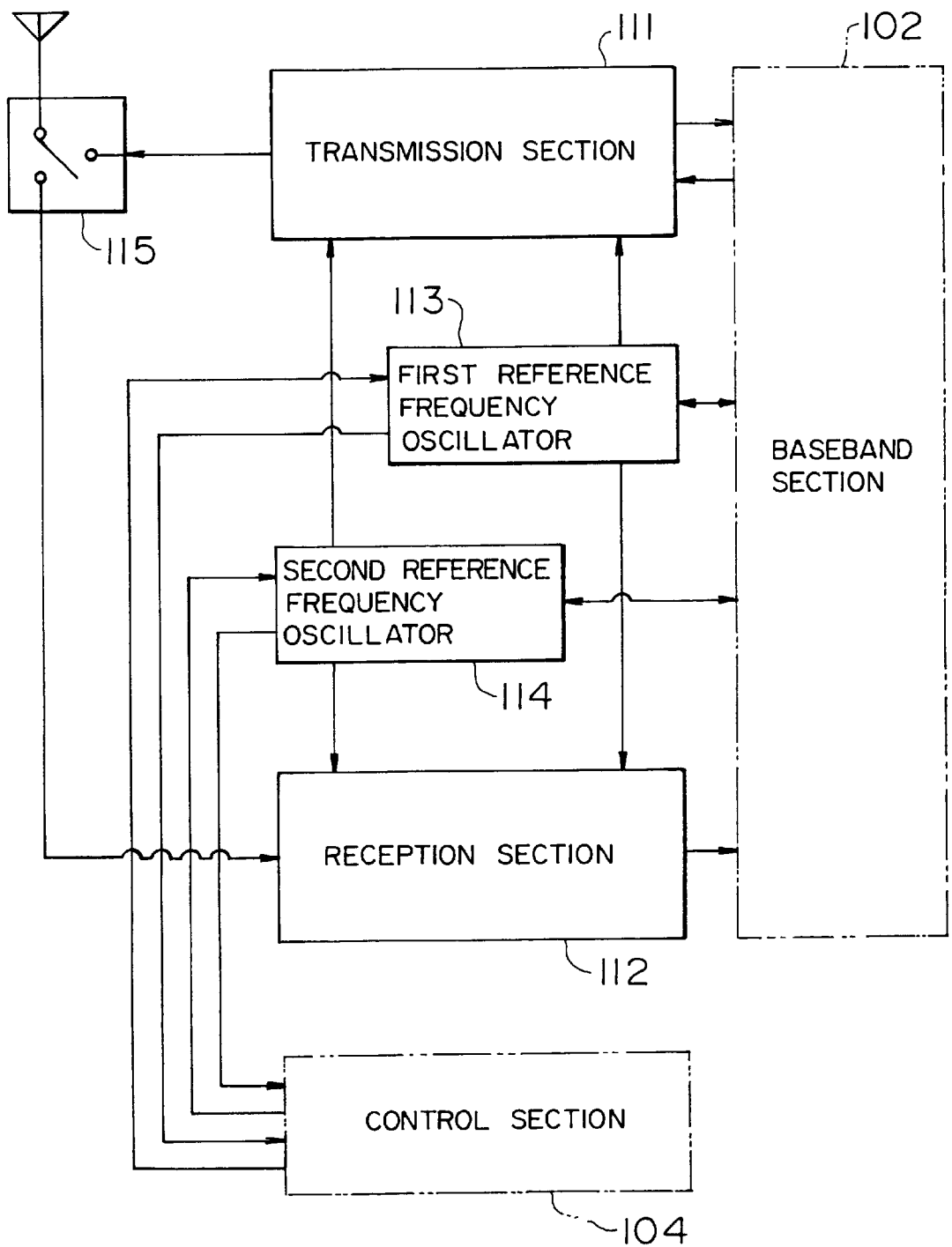
FIG. 2 is a block diagram showing the internal arrangement of the radio section of the subsidiary unit in the embodiment in FIG. 1.

As shown in FIG. 2, the radio section 101 consists of a transmission section 111, a reception section 112, a first reference frequency oscillator 113 for oscillating a fixed reference carrier wave, and a second reference frequency oscillator 114 for oscillating a reference carrier wave which changes in accordance with a channel to which the subsidiary unit is connected. Transmission/reception is performed through a radio channel designated by the control section 104. The baseband section 102 exchanges speech data with the transmitter/receiver section 103, and also exchanges ADPCM (Adaptive Differential Pulse-Code Modulation) data with the radio section 101. Reference numeral 115 in FIG. 2 denotes a transmission/reception switch 115.

The charging detection section 107 detects whether the subsidiary unit is placed on a charging base 109, and sends the detection result to the control section 104. The control section 104 selects a line to be connected to the subsidiary unit on the basis of the detection result. The charging detection section 107 has a known circuit arrangement including, e.g., a sensor.

Figure 3:
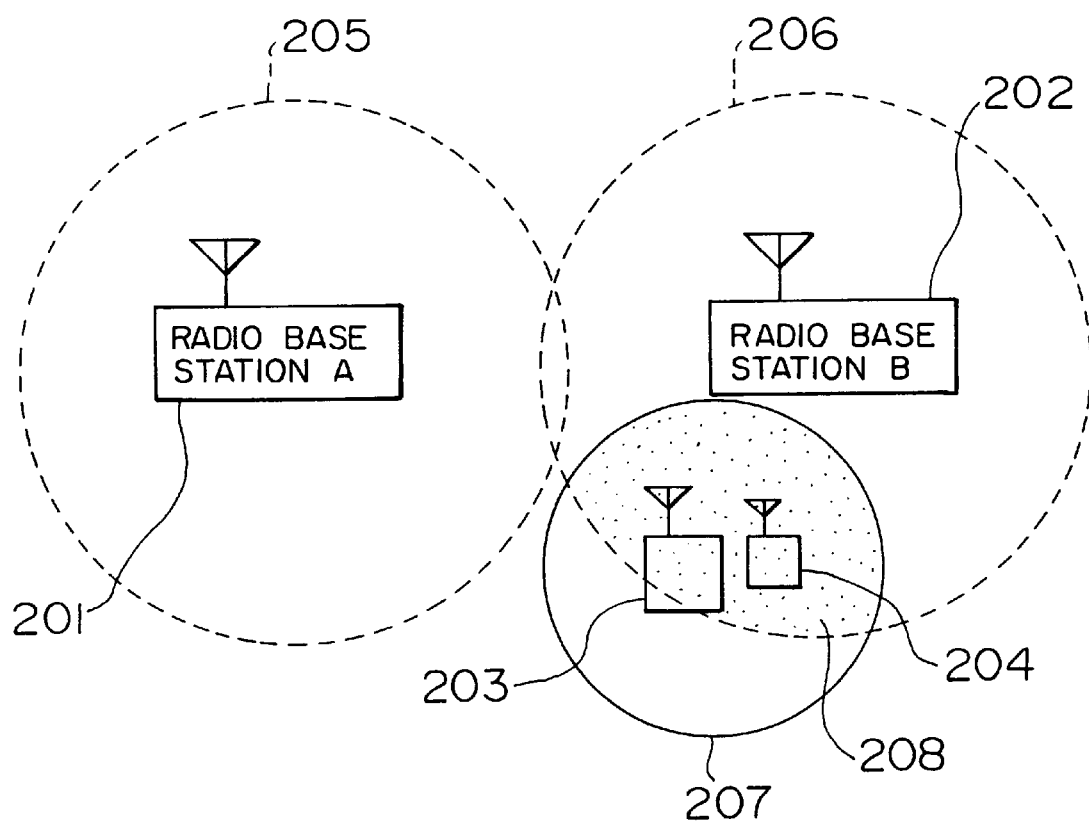
FIG. 3 is a view for explaining a system arrangement associated with the embodiment of the present invention.

FIG. 3 shows the arrangement of the embodiment of the present invention.

Referring to FIG. 3, a radio base station A 201 and a radio base station B 202 connected to a public line are installed outdoors. The radio base station A 201 can be connected to a subsidiary unit 204 in a connection range 205. Similarly, the radio base station B 202 can be connected to the subsidiary unit 204 in a connection range 206.

A master unit 203 connected to a personal line is placed indoors. The master unit 203 can be connected to the subsidiary unit 204 in a connection range 207.

In the case shown in FIG. 3, since the radio base station B 202 is installed near the master unit 203, the connection range 207 of the master unit 203 overlaps the connection range 206 of the radio base station B 202.

FIGS. 4A and 4B respectively show the reception timings of the subsidiary unit of the digital cordless telephone system of the present invention in standby states in the public line connection mode and the personal line connection mode. In the public line connection mode, the subsidiary unit of the digital cordless telephone system performs intermittent reception at the timing in FIG. 4A. In the personal line connection mode, the subsidiary unit performs intermittent reception at the timing in FIG. 4B. That is, the timings of intermittent reception differ depending on the line to be connected to the subsidiary unit.

FIGS. 5A and 5B respectively show the signal formats of identification codes used by the subsidiary unit of the digital cordless telephone system of the present invention in standby states in the public line connection mode and the personal line connection mode. Referring to FIGS. 5A and 5B, in the subsidiary unit of the digital cordless telephone system, the start bit of each of a service company identification code and a system call code is assigned for the identification of the public/personal line connection mode. When the subsidiary unit is connected to the public line, the start bit of the service company identification code is set to "1". When the subsidiary unit is connected to the personal line, the start bit of the system call code is set to "0". With this operation, the line connected to the subsidiary unit can be identified.

In the digital cordless telephone system according to this embodiment, the charging detection section 107 checks whether the subsidiary unit 204 is placed on the charging base 109. If the subsidiary unit 204 is placed on the charging base 109, the control section 104 sets the personal line as a line to be connected to the subsidiary unit, and a standby state is set. If the subsidiary unit 204 is not placed on the charging base 109, the control section 104 sets the public line as the line to which the subsidiary unit is to be connected, and a standby state is set. With this operation, even if the connection range 207 of the master unit 203 overlaps the connection range 206 of the radio base station B 202, the subsidiary unit 204 can be automatically connected to the master unit 203 by placing the subsidiary unit 204 on the charging base 109.

The present invention has been described above with reference to the above embodiment. However, the present invention is not limited to the above form, and includes various forms conforming to the principle of the present invention.

As described above, according to the present invention (claim 1), by detecting whether the subsidiary unit in the digital cordless telephone system is placed on the charging base, a line to be connected to the subsidiary unit is automatically selected, thereby providing convenience for the user.

In addition, according to the present invention (claim 1), the frequency of connection of the subsidiary unit to a radio base station connected to the public line in a range in which the subsidiary unit can be connected to the master unit connected to the personal line can be reduced or eliminated, thereby reducing the charge for lines.

According to the present invention (claim 2), the telephone system preferably includes a charging detection section for detecting whether the subsidiary unit is placed on the charging base. With this simple arrangement, increases in circuit size and cost can be prevented, and an automatic switching operation for the personal line can be performed.

Furthermore, according to the present invention (claim 3), the subsidiary unit preferably includes a control section. The control section performs communication mode switching control on the basis of a signal from the charging detection section. With this arrangement, increases in circuit size and cost can be prevented, and an automatic communication mode switching operation is realized.

What is claimed is:

1. A digital cordless telephone system comprising:
   a plurality of radio base stations connected to a public line and each adapted to cover a service area;
   a master unit connected to a personal line;
   a subsidiary unit which is connected to one of said radio base stations or said master unit through a time-division multiplex radio channel to transmit/receive speech and control data;
   a charging base for charging said subsidiary unit; and
   a communication mode switching unit including means for detecting that said subsidiary unit is placed on said charging base, and a control section for automatically selecting whether to connect said subsidiary unit to one of said radio base stations or said master unit depending on whether said subsidiary unit is placed on said charging base.

2. A system according to claim 1, wherein said means for detecting whether said subsidiary unit is placed on said charging base and said control section are arranged in said subsidiary unit.

3. A system according to claim 1, wherein when a connection range of said master unit overlaps a connection range of said radio base station, said control section performs switching control such that the personal line is selected as a line to be connected to said subsidiary unit when said detection means detects that said subsidiary unit is placed on said charging base, and the public line is set as a line to be connected to said subsidiary unit when said detection means detects that said subsidiary unit is not placed on said charging base.

4. A digital cordless telephone system comprising:

- a plurality of radio base stations connected to a public line, each of said plurality of radio base stations adapted to cover a service area;
- a master unit connected to a personal line;
- a subsidiary unit connected to one of said plurality of radio base stations or to said master unit through a time-division multiplex radio channel in order to transmit and receive speech and control data;
- a charging base for charging said subsidiary unit; and
- a communication mode switching unit including a detector and a control section, said detector detecting the presence of said subsidiary unit on said charging base, said control section automatically selecting whether to connect said subsidiary unit to said one of said plurality of radio base stations or to said master unit in response to said detection by said detector of the presence of said subsidiary unit on said charging base.

5. The system according to claim 4, wherein said detector and said control section are arranged in said subsidiary unit.

6. The system according to claim 4, wherein when a connection range of said master unit overlaps a connection range of said one of said plurality of radio base stations, said control section performs switching control such that said personal line is selected as a line to be connected to said subsidiary unit when said detector means detects the presence of said subsidiary unit on said charging base, and wherein said public line is set as a line to be connected to said subsidiary unit when said detector does not detect the presence of said subsidiary unit on said charging base.

* * * * *